United States Patent
Abad et al.

(10) Patent No.: US 10,467,341 B1
(45) Date of Patent: Nov. 5, 2019

(54) SYSTEMS AND METHODS FOR DETERMINING DOCUMENT COMPATIBILITY

(71) Applicant: Capital One Services, LLC, McLean, VA (US)

(72) Inventors: Fardin Abdi Taghi Abad, Seattle, WA (US); Austin Walters, McLean, VA (US); Jeremy Edward Goodsitt, McLean, VA (US); Reza Farivar, McLean, VA (US); Vincent Pham, McLean, VA (US); Anh Truong, McLean, VA (US); Kenneth Taylor, Champaign, IL (US); Mark Watson, Urbana, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/401,075

(22) Filed: May 1, 2019

Related U.S. Application Data

(60) Provisional application No. 62/783,612, filed on Dec. 21, 2018, provisional application No. 62/783,731, filed on Dec. 21, 2018.

(51) Int. Cl.
*G06F 17/27* (2006.01)
*H04L 29/06* (2006.01)

(52) U.S. Cl.
CPC ........ *G06F 17/277* (2013.01); *G06F 17/2775* (2013.01); *H04L 67/42* (2013.01)

(58) Field of Classification Search
CPC ..... G06F 17/27; G06F 17/277; G06F 17/2775
See application file for complete search history.

(56) References Cited

U.S. PATENT DOCUMENTS

| | | | |
|---|---|---|---|
| 6,560,620 B1 | 5/2003 | Ching | |
| 7,181,017 B1 | 2/2007 | Nagel et al. | |
| 7,260,773 B2 * | 8/2007 | Zernik | G06F 17/2211 707/999.202 |
| 8,121,989 B1 * | 2/2012 | Gengelbach | G06F 17/2288 707/695 |
| 9,166,986 B1 * | 10/2015 | Saylor | H04L 63/123 |
| 9,262,465 B1 * | 2/2016 | Chen | G06F 16/2365 |
| 2004/0215667 A1 | 10/2004 | Taylor et al. | |

(Continued)

*Primary Examiner* — Paras D Shah
(74) *Attorney, Agent, or Firm* — Troutman Sanders LLP; Christopher J. Forstner; John A. Morrissett

(57) ABSTRACT

A method for determining document compatibility between documents stored locally on a plurality of user devices, while maintaining the confidentiality of each of the respective documents. The method includes requesting and receiving a token from each of the plurality of user devices, the token indicative of the presence or absence of a specific element in each respective document. The method further includes comparing the value of each of the respective tokens. When each of the tokens have a true value, the specific element for each respective document to be compatible and sends a message to each of the plurality of user devices indicating the compatibility of the respective documents. When at least one of the tokens has a false value, the specific element for each respective document to be incompatible and sends a message to each of the plurality of user devices indicating the incompatibility of the respective documents.

20 Claims, 7 Drawing Sheets

(56) References Cited

U.S. PATENT DOCUMENTS

| | | | |
|---|---|---|---|
| 2006/0015807 A1* | 1/2006 | Chellis | G06F 17/2288 |
| | | | 715/229 |
| 2016/0043988 A1* | 2/2016 | Birch | H04W 4/14 |
| | | | 709/206 |
| 2016/0294752 A1* | 10/2016 | Wu | H04L 51/16 |
| 2017/0220567 A1* | 8/2017 | Masson | G06F 17/243 |
| 2018/0011846 A1* | 1/2018 | Guzman | G06Q 40/12 |
| 2018/0196623 A1* | 7/2018 | Hsu | G06F 3/1204 |

\* cited by examiner

SYSTEMS AND METHODS FOR DETERMINING DOCUMENT COMPATIBILITY

CROSS-REFERENCE TO RELATED APPLICATION

This Application claims the benefit of, and priority under 35 U.S.C. § 119(e) to, U.S. Provisional Patent Application Nos. 62/783,612 and 62/783,731, titled "Methods and Systems for Determining Document Compatibility" and "Systems and Methods for Maintaining Contract Adherence," respectively, both filed Dec. 21, 2018, the contents of which are hereby incorporated by reference herein in their entirety as if fully set forth below.

FIELD

The presently disclosed subject matter relates generally to identifying elements within a document and, more particularly, to systems and methods for determining the compatibility of documents based on the identified elements.

BACKGROUND

Document comparison, and more specifically contract comparison, often requires each party to disclose their individual contracts to other parties to determine the compatibility of various elements within the contracts. As a result, each party is aware of the contents of the other parties' contracts. In some cases, such as when the contracts themselves are confidential or include confidential information, this may be undesirable.

Accordingly, there is a need for improved systems and methods for determining the compatibility of documents from a plurality of parties without revealing the contents to other parties. More specifically, a need exists for analyzing and determining the compatibility of one or more elements within a contract or determining the overall compatibility of two contracts.

SUMMARY

Aspects of the disclosed technology include systems and methods for determining document compatibility. Consistent with the disclosed embodiments, the systems and methods may utilize one or more computing devices, web servers, processors, and databases. In some cases, certain systems and methods may include a processor receiving a first token from each of a plurality of parties. The first token may be associated with an element of a contract and may have a value of true or false. The processor may identify the value of the first token. When the processor identifies each of the first tokens as having a true value, for example, that element of the contract from each party is determined to be compatible. Responsive to determining the compatibility of the element from each party, the processor outputs a second message indicating the compatibility. When the processor identifies at least one of the tokens as having a false value, the element from each party is determined to be incompatible. In this scenario, the processor can output a first message indicating incompatibility.

Further features of the present disclosure, and the advantages offered thereby, are explained in greater detail hereinafter with reference to specific embodiments illustrated in the accompanying drawings, wherein like elements are indicated with like reference designators.

BRIEF DESCRIPTION OF THE DRAWINGS

Reference will now be made to the accompanying drawings, which are not necessarily drawn to scale, and which are incorporated into, and constitute a portion of, this disclosure. The drawings illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

Examples of the present disclosure are discussed below in terms of reviewing multiple contracts for compatibility. These examples are provided merely for ease of explanation and should not be construed to limit the disclosure. One of skill in the art will recognize that the system is also applicable to the review of other types of documents, software, or many other types of data where compatibility between multiple users or multiple versions is a concern. In addition, the discussion of particular components, methods, or algorithms (e.g., a garbled circuits algorithm, discussed below) should not be construed to preclude the use of other components, methods, or algorithms. Thus, the disclosure in all respects is intended to be illustrative and not limiting. It should also be understood that the mention of one or more method steps does imply a particular order of steps, nor does it preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
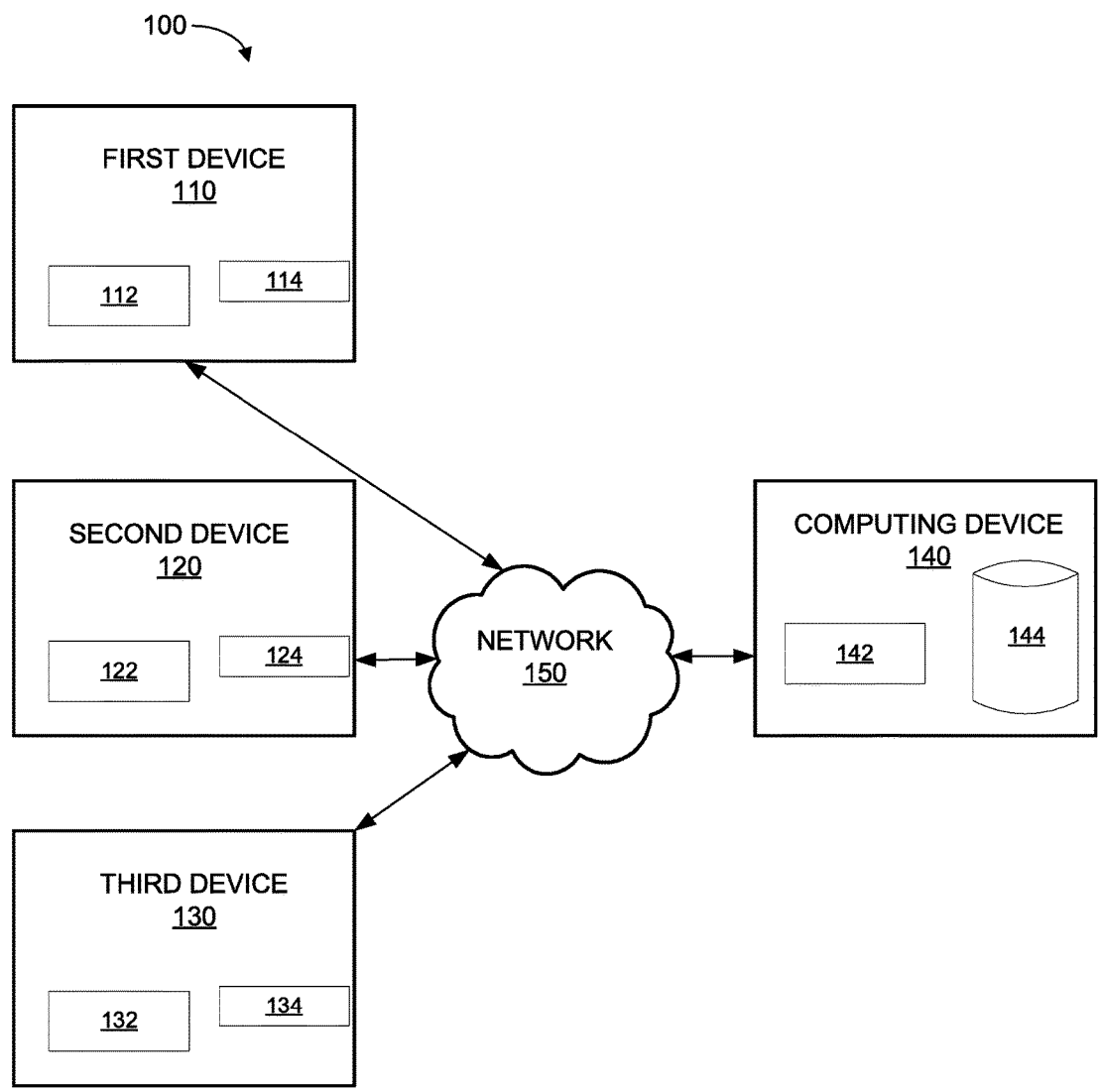
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes a first device 110, a second device 120, a third device 130, a network 150, one or more computing devices 140 which may include a processor 142, and a database 144. The first device 110, the second device 120, and third device 130 may include respective processors 112, 122, and 132, and respective applications 114, 124, and 134. As non-limiting examples, the devices 110, 120, 130 may be personal computers, smartphones, laptop computers, tablets, or other personal computing devices. The network 150 may include a network of interconnected computing devices including, for example, an intranet, a WiFi network, or the Internet. The computing device 140 may include one or more physical or logical devices (e.g., servers, cloud servers, etc.) or drives. An example computer architecture that may be used to implement the devices 110, 120, 130 and/or the computing device 140 is described below with reference to FIG. 7.

In some examples, the first device 110 may include an application 114 and/a processor 112. The second device 120 and/or the third device 130 may also perform functions similar to the first device 110 as described herein. The processor 112 may receive a request from the computing device 140 to determine if an element (e.g., an indemnity clause) is included in a contract, or other document, stored on the first device 110. The application 114 may provide a user interface (UI), or other selection method, to enable the user to open the document for review in the application 114.

The application 114 can process the document using a suitable algorithm (e.g., a garbled circuits algorithm) and the processor 112 to determine whether the document includes the element (e.g., the indemnity clause). The algorithm may be performed locally on devices 110, 120, and/or 130 as well as centrally on computing device 140. Locally, the algorithm may receive the contents of the document as an input and apply a condition to the document (e.g., determining whether an indemnity clause exists). Based on instructions provided by the algorithm, processor 112 may compile the document into a finite state machine representation and then use a model checker or a similar tool to determine whether the element exists within the document. Identifying the requested element may involve, for example, the processor 112 using the algorithm to parse a plurality of phrases from amongst the text of the document, compare each of the plurality of phrases to the element in the request, and find a match between at least one of the plurality of phrases and the element.

The processor 112 may also generate a token indicating whether the requested element exists within the document. The first token may have a Boolean value (e.g., true or false), for example, or may include a numerical value to indicate that the document is more or less compatible with the element. In other words, if the request is related to whether the document includes a choice of law clause from a particular state, for example, the token may be set to zero if no choice of law clause is included in the document, five if there is a choice of law clause, but the clause includes the wrong state, and ten if there is a choice of law clause from the state in the request.

Thus, the token can distinguish between both types of clauses, for examples, and features contained within the clause. In a contract setting, types of clauses can include, for example, choice of law, indemnity, arbitration, and representations and warranties. In an indemnity clause, features can include, for example, environmental, tax, debt, and litigation indemnities. Of course, the types of elements and the features of each element can change with the type and subject of the documents being reviewed.

When the element exists within the document, the processor 112 may generate the first token and assign a true value. Conversely, the processor 112 may generate the first token and assign a false value when the element does not exist within the document. In generating the first token, the processor 112 may also encrypt the first token such that any identification data is unreadable within the token without de-encryption. The first token may be a data structure, packets of data, and/or a dataset with fields indicating the element, the compatibility of the element, and other information associated with the document. So, for example, the data structure may include a token for each element of a document—e.g., "indemnity clauses," "definitions," "venue," "severability clauses," etc.—and the token can indicate whether a particular document includes a particular clause (e.g., indemnity clause=true) or not (e.g., "definitions"=false). Of course, other elements and other values could be used for different types of documents or to provide more granular compatibility ratings.

The processor 112 may also transmit the first token to the computing device 140. In response the computing device 140 may compare the token received from the first device 110 to tokens received from other devices (e.g., devices 120, 130) to determine if the element in the request is compatible for all documents on all devices 110, 120, 130. The computing device 140 can then send a message to one or more of the devices 110, 120, 130 indicating the incompatibility or the compatibility of the document from the first device 110 with documents from the two other devices 120, 130 with regard to the element. The computing device 140 may send a first message indicating the incompatibility, for example, or a second message indicating the compatibility.

In some embodiments, the first device 110 may receive a plurality of requests for elements or a request for a plurality of elements from the computing device 140. In response, the first device 110 may generate a respective first token, second token, third token, etc. According to some embodiments, the first device 110 may receive the first message or the second message indicating the compatibility of the documents based on an aggregate of the plurality of elements. For example, the first device 110 may transmit the first token, the second token, and the third token to the computing device 140; and in response, the computing device 140 can send the second message indicating the user's document is compatible with the other users' documents with respect to some or all of the plurality of elements.

Turning to the computing device 140, in some embodiments, the computing device 140 may include a database 144 and a processor 142. The computing device 120 may also execute the algorithm or a similar algorithm. Using the algorithm, the computing device 140 may transmit a request for a specified element (e.g. existence of a warranty clause) to a plurality of user devices (e.g., the devices 110, 120, 130). In response, the computing device 140 can receive a token from each of the devices 110, 120, 130. Because the devices 110, 120, 130 employ a suitable algorithm (e.g., the garbled circuits algorithm or similar), the computing device 140 cannot determine which device 110, 120, 130 sent the token. The computing device 140 merely identifies the value associated with each token and determines the compatibility of each specified element by computing and/or comparing the value of the tokens. Compatibility may exist when each token has the same value, for example, while the existence of at least one token with a different value may cause the computing device 140 to determine the documents are incompatible.

In some embodiments, the computing device 140 may request a plurality of elements from a plurality of user devices (e.g., the devices 110, 120, 130). According to some embodiments, a request for further elements may be predicated upon a determination of compatibility for the previous element(s). The computing device 140 may identify the element of each of the received tokens from amongst the plurality of tokens and group each of the respective tokens based on the element. The computing device 140 may further identify the value of each of the grouped tokens and compare the value of each of the grouped tokens to one another.

In some examples, when the computing device 140 determines that each of the respective grouped tokens has the same value, the computing device 140 may determine the elements of each of the respective tokens are compatible. Alternately, when the computing device 140 determines that at least one of the respective grouped tokens has a different value, the computing device 140 may determine that the elements of each of the respective tokens are incompatible. The computing device 140 may transmit the message indicating the incompatibility or the compatibility based on a specific element and/or an aggregate of elements. When the second message indicates the compatibility of the documents based on an aggregate of elements, for example, each document may be required to have the same value for each element or may have to have a sufficiently high aggregate compatibility score, among other things. If not, the computing device 140 will transmit the first message indicating the incompatibility to each of the user devices.

Figure 2:
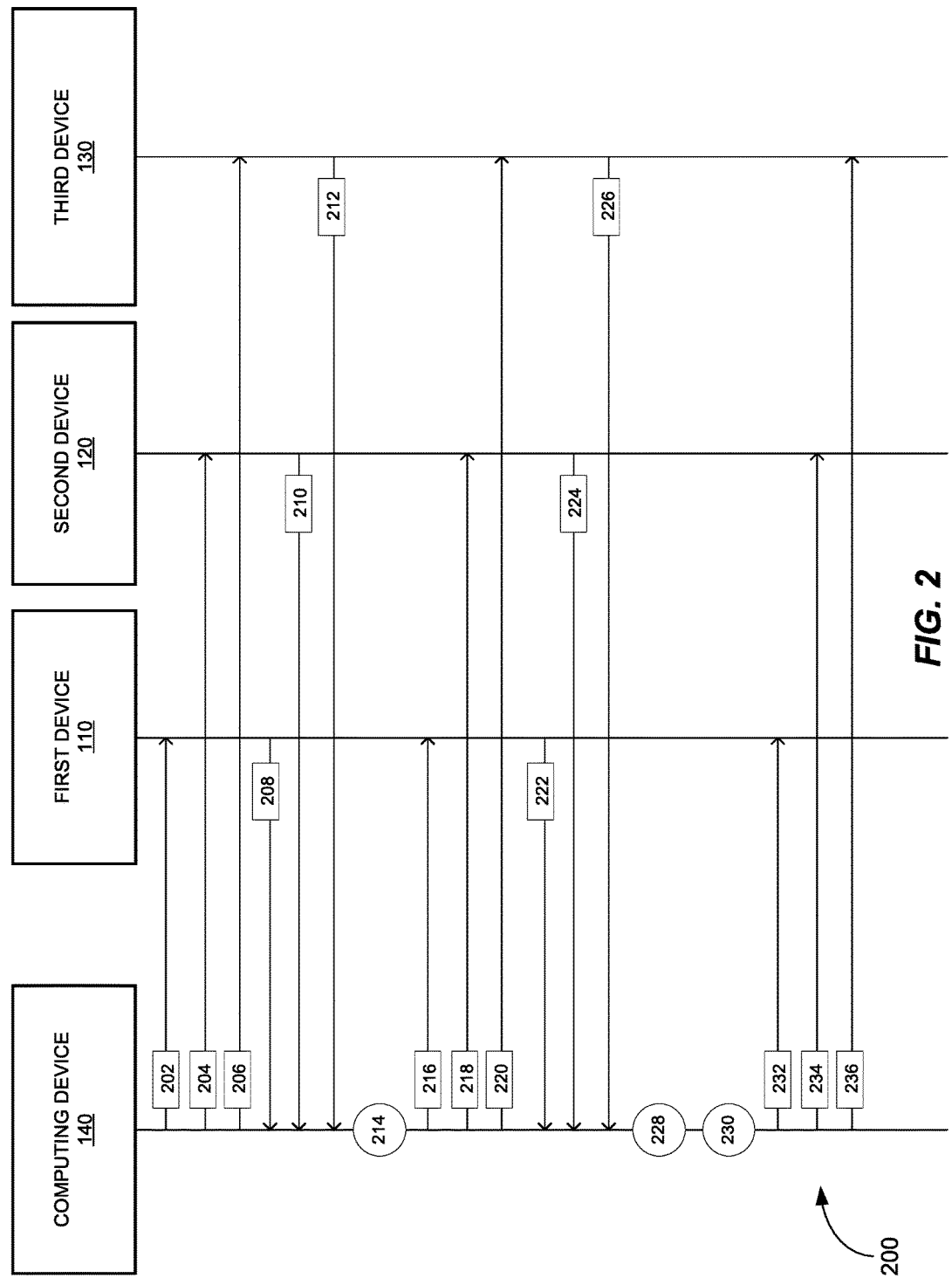
FIG. 2 is an example timing diagram for determining document compatibility received from a plurality of parties, in accordance with some examples of the present disclosure.

FIG. 2 illustrates an example timing diagram for determining the compatibility of a plurality of documents received from a plurality of parties. The timing diagram is written from the perspective of the computing device 140 in communication with three user devices (e.g., the devices 110, 120, 130) to determine the compatibility of various elements of their respective documents.

At steps 202-204, the computing device 140 may transmit a first request to each of the devices 110, 120, 130, respectively, based on the first element. The element is an identifiable portion of a document. For a document such as a contract, the element may be a warranty clause, an indemnity clause, a liability clause, a section listing parties to the contract, and/or the like. After determining whether a requested element exists in a particular document stored on the first device 110, for example, at 208, the first device 110 may transmit a token to the computing device 140. Similarly, at steps 210 and 212, the second device 120 and the third device 130, respectively, may transmit a token to the computing device 140. Each token received by the computing device 140 at steps 208-212 may correspond to the same element, but from each respective device 110, 120, 130. Further, each token may have a value of either true or false, a score, a numerical value, or some other indicator of compatibility. For a Boolean value, the true value can indicate that the element exists within the document, for example, while the false value indicates that the element does not exist within the document.

At 214, the computing device 140 may determine the compatibility of the plurality of documents by comparing the tokens from each of the devices 110, 120, 130. For the computing device 140 to make the determination that—at least based on the particular element—the plurality of documents is compatible, each token must have a true value. At steps 216-220, the computing device 140 may transmit a second request to each of the devices 110, 120, 130, respectively, based on a second element. According to some embodiments, transmitting the second request may be contingent upon a determination the compatibility of the document based on the first element. At steps 222-226, the computing device 140 may receive a second token from each of the devices 110, 120, 130. At 228, the computing device 140 may determine, based on the second element, whether the plurality of documents are compatible. In some examples, at 230, the computing device 140 may determine whether the plurality of documents are compatible based on an aggregate of the first token and the second token. The plurality of document may be determined to be compatible when each element for each document has the same value or when each element for each document has a sufficiently high numerical value. At steps 232-236, when the documents are found to be compatible, the computing device 140 may output the second message (indicating document compatibility) to each of the devices 110, 120, 130.

Figure 3:
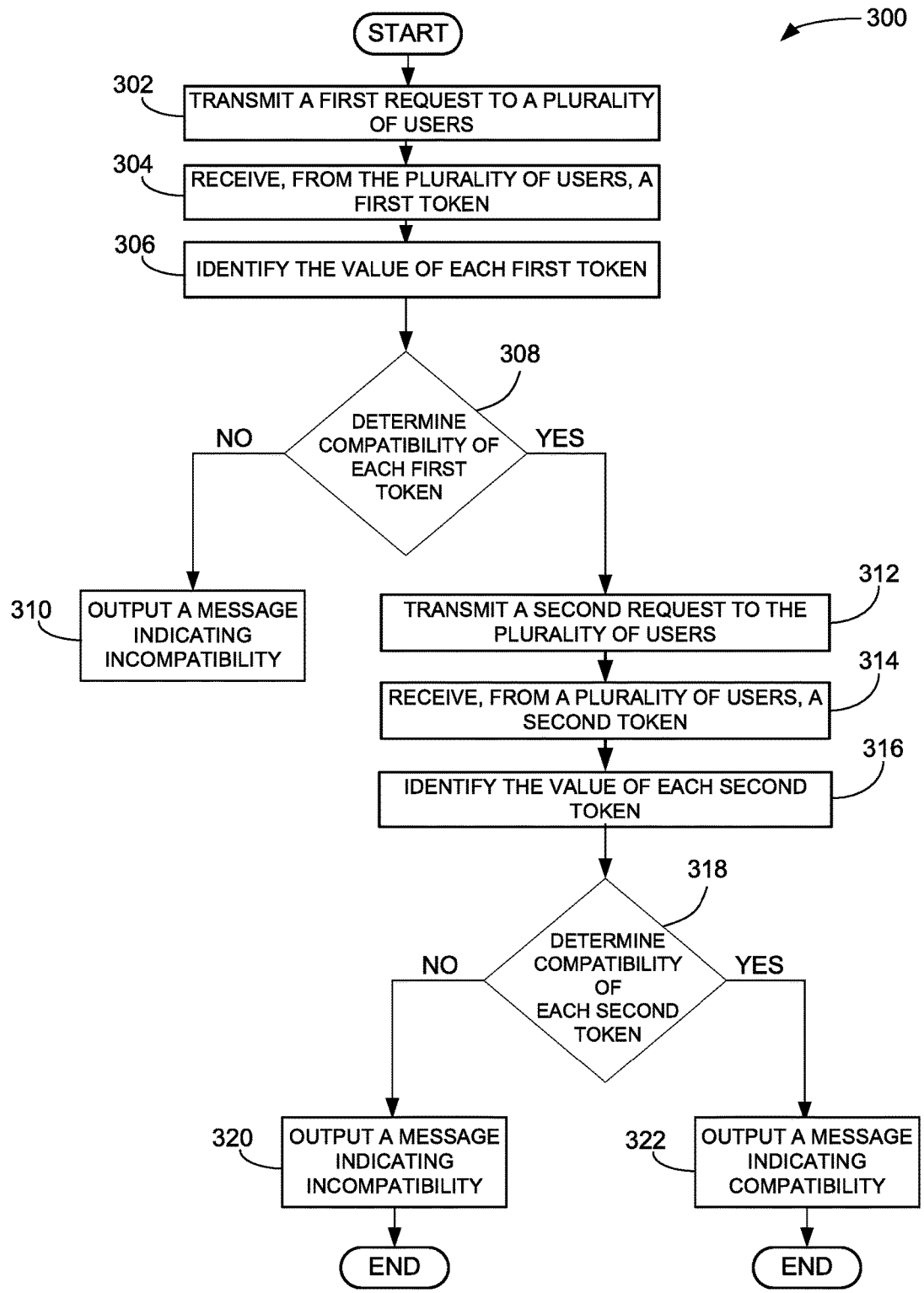
FIG. 3 is an example flow chart for a method of determining document compatibility, in accordance with some examples of the present disclosure.

FIG. 3 illustrates an example flow chart for a method of determining document compatibility. Similar to FIG. 2, the flow chart is written from the perspective of the computing device 140 in communication with the devices 110, 120, 130. The flow chart illustrates the steps involved in determining compatibility of various elements of each user's document.

At 302, the process 142 may transmit a first request to each of the plurality of users (e.g., devices 110, 120, 130). The first request may include a first element (e.g., a warranty clause). Based on the first request, each of the plurality of users may generate a first token with a value indicative of whether their respective document contains the first element. For example, the first token has a value of either true or false. At 304, the processor 142 may receive the first token from each of a plurality of users. At 306, the processor 142 may identify the value of the first token, i.e., whether the token has a true value or a false value. In some embodiments, the processor 142 may also identify the element associated with the first token based on an identifier associated with the first token. At 308, the processor 142 may determine the compatibility of each first token. The processor 142 may determine each of the first tokens are compatible when each first token has the same value (e.g., all are true or all are false). Because each first token is associated with the first element, token compatibility is synonymous with the compatibility of the first element for each document.

At 310, the processor 142 may output the second message indicating the incompatibility of the documents based on the first token incompatibility determined earlier at step 306. Optionally, at 312, in response to the processor 142 determining the compatibility of each first token at 308, the processor 142 may transmit a second request that includes a second element to each of the plurality of users. At 314, the processor 142 may receive the second token from each of the plurality of users. Similar to the first token, in this example, the second token may be associated with the second element and may have a value of either true or false. At 316, the processor 142 may identify the value of each second token.

At 318, the processor 142 may determine the compatibility of each second token in a similar manner as step 308. At 320, the processor 142 may output the first message indicating the incompatibility of the documents based on second token incompatibility determined earlier at step 318. The processor 142 may output the first message to the plurality of the users (e.g., devices 110, 120, 130). Conversely, at step 322, the processor 142 may output the second message indicating the compatibility of the documents based on second token compatibility determined earlier at step 314. Similar to above, the processor 142 may output the second message to the plurality of users.

Figure 4:
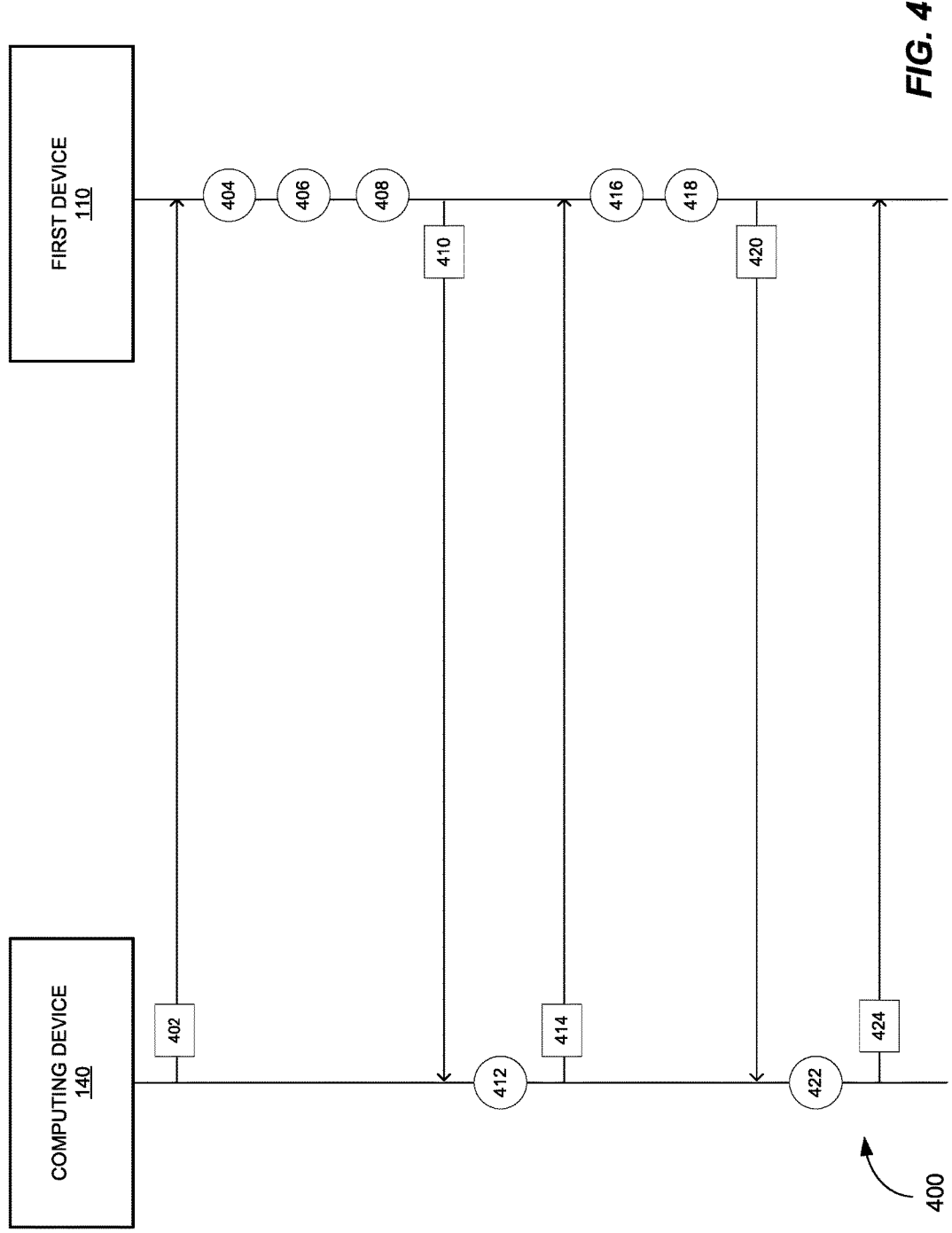
FIG. 4 is another example timing diagram for receiving a determination of document compatibility, in accordance with some examples of the present disclosure.

FIG. 4 illustrates another example timing diagram for receiving a determination of document compatibility. The timing diagram represents the perspective of a user (e.g., first device 110) in communication with the computing device 140 to determine whether portions of the user's document are compatible with portions of documents belonging to two other users.

At 402, the computing device 140 may output, to the first device 110, the first request. The first request for may seek receipt of the first element. For instance, the first request may seek a contract term such as an indemnity clause. At 404, the user may select the document and provide it to the application 114. At 406, in response to the first request, the processor 112 may identify the first element within the document. Next, at 408, the processor 112 may generate the first token. The generated first token may have a field indicating the first element (e.g., indemnity clause), a value of either true or false indicating the existence or inexistence of the indemnity clause, respectively. In some embodiments, the processor 112 may also assign an identifier representative of the specific element to the first token. At 410, the processor 112 may output the first token to the computing device 140. Also, at 410, the computing device 140 may receive a plurality of first tokens from each of a plurality of users (e.g., devices 120 and 130).

At 412, the computing device 140 may determine whether the documents share the same first element based on a comparison of each of the plurality of first tokens. If each first token has the same value, all the documents either have or lack the first element. In other words, all true values indicate that each document contains the first element and all false values indicates that each document lacks the first element. Further, determining the documents have differing values for the first element may indicate the documents are incompatible. In such an instance, the computing device 140 may transmit the first message indicating the incompatibility. However, in this example, the computing device 140 may determine the documents share the same value for the first element. As a result, at 414, the computing device 140 may output the second message to the first device 110 indicating the documents are compatible based on the first token. In some embodiments, the second message may also include the second request for the second element. Also, in some embodiments, the computing device 140 may output the second message to the plurality of users (e.g., device 120, 130) that sent the first token.

At 416, the first device 110 may identify from the document the second element. At 418, the first device 110 may generate a second token based on the second element. The second token may have a value of either true or false which indicates whether the second element exists within the document. At 420, the first device 110 may transmit the second token to the computing device 140. Also, at 420, the computing device 140 may receive the second token from each of the plurality of users. At 422, the computing device 140 may compare each of the second tokens to determine the compatibility of the document based on the second token. At 424, the computing device 140 may output the second message or the first message to the first device 110 indicating whether the documents are determined to be compatible or incompatible, respectively, based on the second token.

Figure 5:
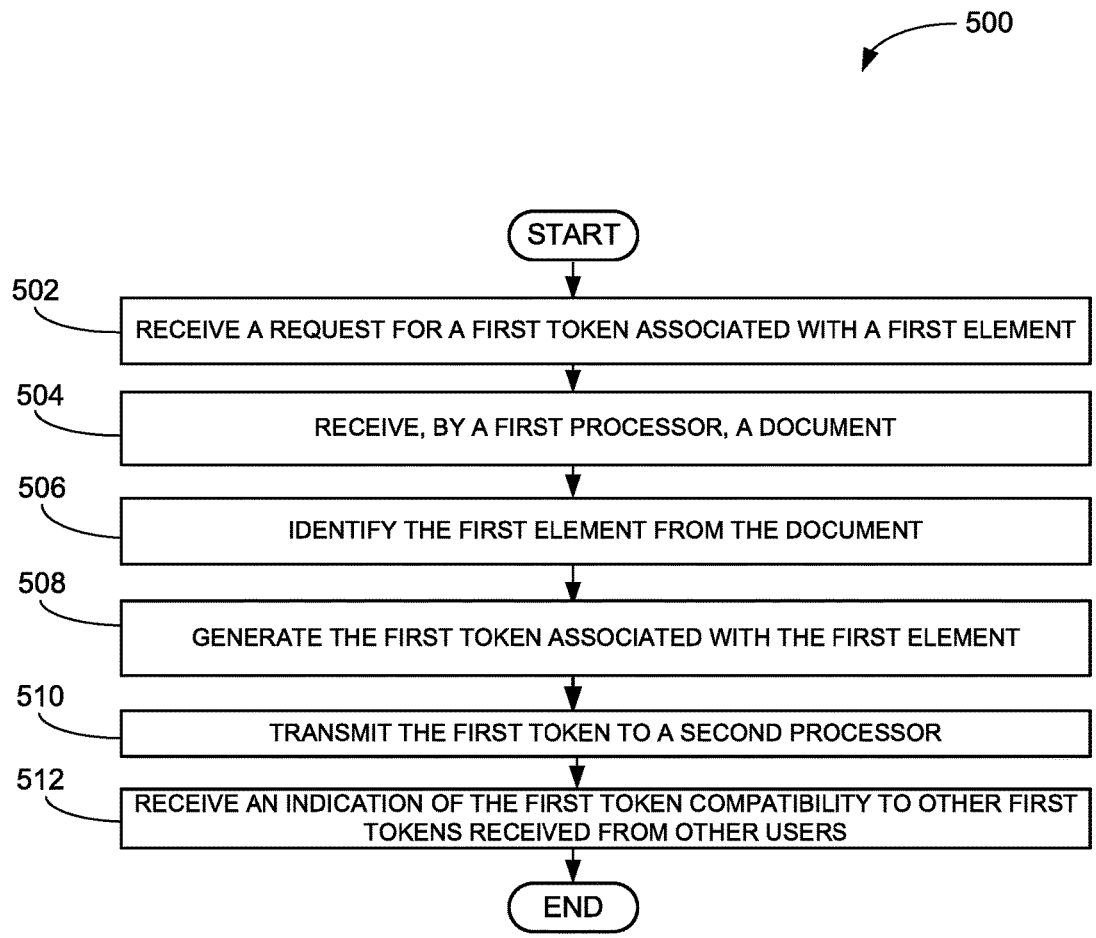
FIG. 5 is another example flow chart for a method of determining document compatibility, in accordance with some examples of the present disclosure.

FIG. 5 is an example flow chart for a method of determining document compatibility. Similar to FIG. 4, the flow chart represents the perspective of a user device (e.g., first device 110) in communication with the computing device 140 to determine document compatibility with documents of two or more other users. At 502, the processor 112 may receive the first request for the first token associated with the first element. According to some embodiments, the computing device 140 may transmit the first request for the first token to the processor 112. In response, at 504, the processor 112 may retrieved the document (e.g., from memory located in the user device). In some embodiments, the user may select the document via the application 114 and the application 114 may provide the document to the processor 112. In some embodiments, the application 114 may generate an alert, for display, to the first device 110 seeking the document.

At 506, the processor 112 may identify the first element from within the document. Identifying the first element may be provided by an algorithm translating the document into plain English and checking the document against known terms. At 508, the processor 112 may generate the first token with a value between one and ten indicating the compatibility of the document with the request. A value of five out of ten, for example, may indicate that the document has a choice of law clause, but that it is for the wrong state. In other words, the document is only "half" compatible. Additionally, the first token may have an identifier indicating the first token is associated with a choice of law clause.

At 510, the processor 112 may transmit the first token to the computing device 140. The computing device 140 may receive the plurality of first tokens from other users (e.g., devices 120, 130). The computing device 140 may determine whether each of the first tokens are compatible. In the example mentioned above, and depending on the inquiry, the computing device 140 may determine the first tokens to be compatible when each of the first tokens has a value of ten, for example, or when each of the tokens has a value above a predetermined value (e.g., five or higher). If the original compatibility question was, "Do all of the documents have a choice of law clause?", for example, then a value of five or greater may be sufficient. If, on the other hand, the original compatibility question was, "Do all of the documents have a Nevada choice of law clause?", for example, then a value of ten may be required. Of course, the values and granularity of the compatibility can be varied according to the complexity of the inquiry. If the tokens do not have a high enough value, or the same value, respectively, the computing device 140 may transmit an indication that the first tokens are incompatible (e.g., the second message).

Figure 6:
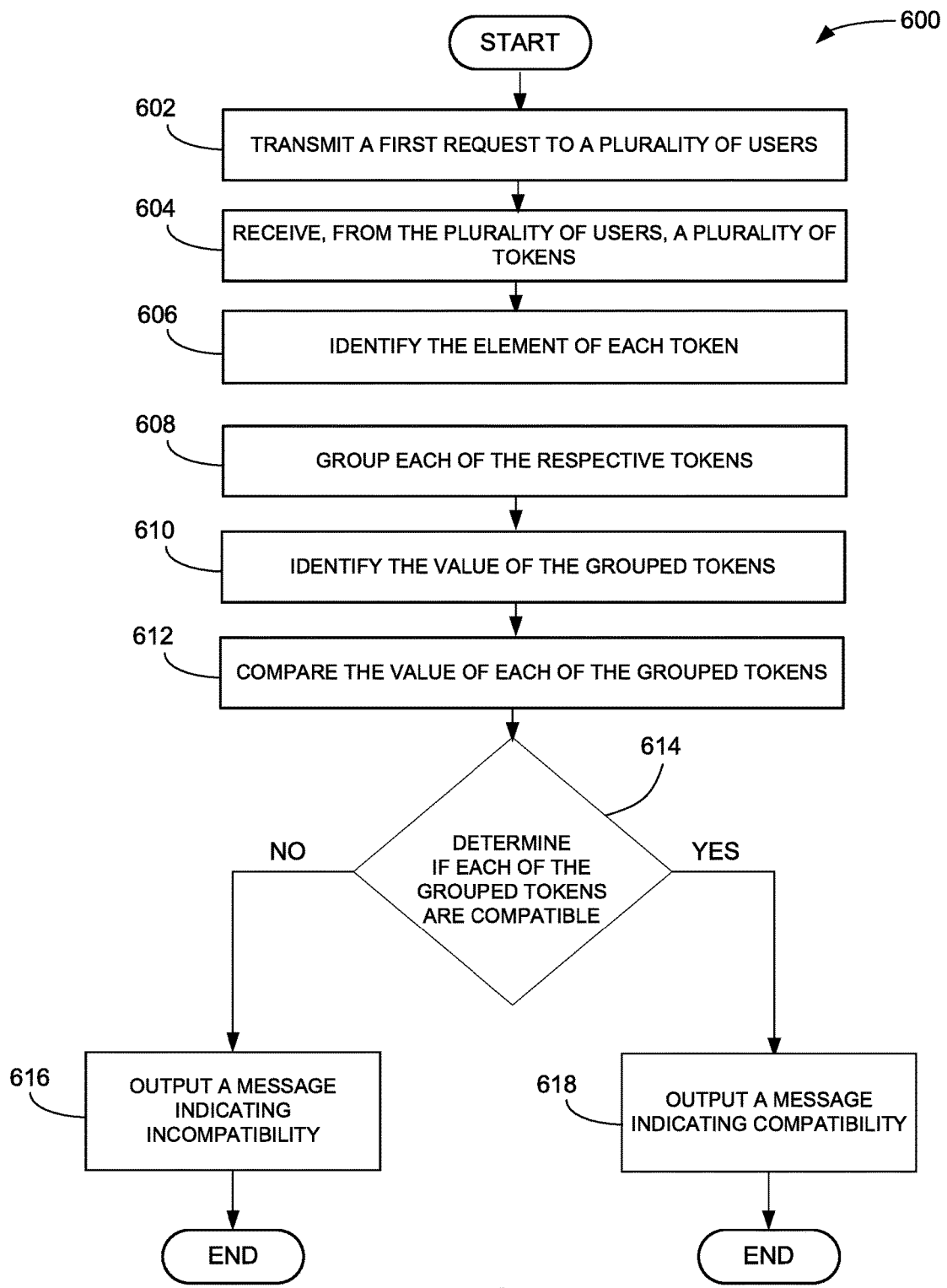
FIG. 6 is a third example flow chart for a method of determining document compatibility, in accordance with some examples of the present disclosure.

FIG. 6 illustrates an example flow chart for a method of determining document compatibility. The flow chart represents the perspective of the computing device 140 receiving the plurality of first tokens, the plurality of second tokens, and the plurality of third tokens in one instance from each of the plurality of users. The computing device 140 determines overall document compatibility based on the plurality of first tokens, the plurality of second tokens, and the plurality of third tokens.

At 602, the processor 142 may transmit the first request to the plurality of users. In some embodiments, the first request may seek a plurality of elements from each user. In response, at 604, the processor 142 may receive the plurality of first tokens, the plurality of second tokens, and the plurality of third tokens from each of the plurality of users (e.g., the devices 110, 120, 130). In some embodiments, the plurality of first tokens, the plurality of second tokens, and the plurality of third tokens, transmitted by the user may be collectively representative of all or several elements of the document. At 606, the processor 142 may identify the element of each of the tokens. Identifying the element may involve determining the identifier associated with the token. At 608, the processor 142 may group each of tokens based on the tokens having the same or similar element. For example, tokens representing an indemnity clause may all be grouped together and tokens representing a liquidation clause may all be grouped together.

At 610, the processor 142 may identify the value of each of the grouped tokens, e.g., whether each of the tokens has a true or false value. At 612, the processor 142 may compare the value of each of the grouped tokens. For example, the value of tokens representing an indemnity clause are all compared and the value of tokens representing a liquidation clause are all compared. At 614, the processor 142 may determine if each of the grouped tokens are compatible. The processor 142 may determine a group of tokens to be compatible when each of the tokens has the same value. Conversely, the processor 142 may determine a group of tokens to be incompatible when at least one of the tokens has a different value. In this embodiment, to determine the document is compatible with each of the other documents, each of the grouped tokens must match.

At 616, subsequent to determining the incompatibility, the processor 142 may output the first message to the plurality of users (e.g., to devices 110, 120, 130) indicating the incompatibility. At 616, subsequent to determining the compatibility, the processor 142 may output the second message to the plurality of users indicating the compatibility.

Figure 7:
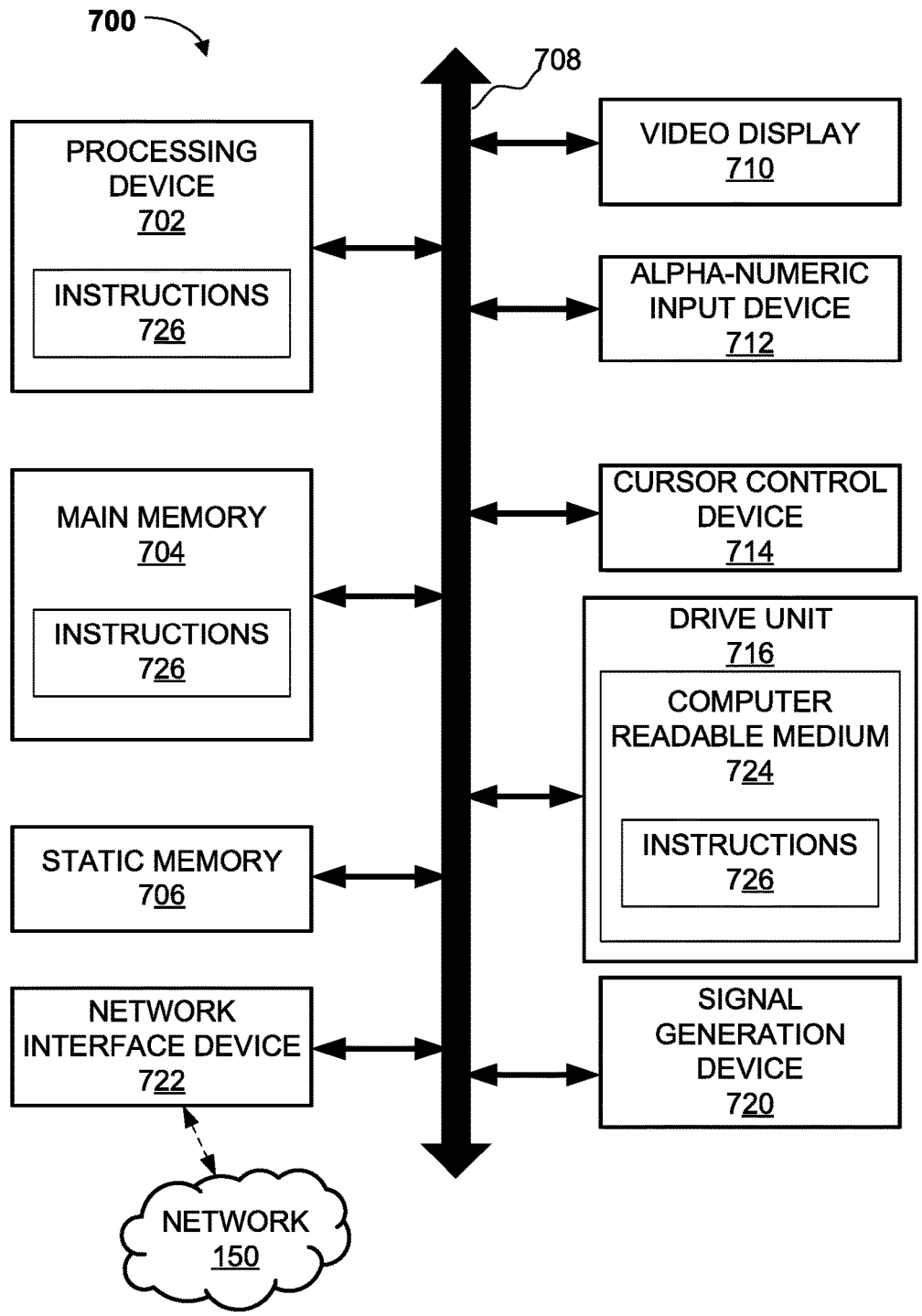
FIG. 7 is a block diagram of an example computer system that may implement certain aspects of the present disclosure.

FIG. 7 is a block diagram of an example computer system 700 that may implement certain aspects of the present disclosure. The computer system 700 may be representative of the first device 110, the second device 120, the third device 130, and/or the computing device 140. The computer system 700 may include a set of instructions 726 for controlling operation of the computer system 700. In some implementations, the computer system 700 may be connected (e.g., networked) to other machines in a Local Area Network (LAN), an intranet, an extranet, a satellite communications system, or the Internet. The computer system 700 may operate in the capacity of a server or a client machine in a client-server network environment, or as a peer machine in a peer-to-peer (or distributed) network environment. The computer system 700 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify elements to be taken by that machine. Further, while a single computer system 700 is illustrated, the term "machine" shall also be taken to include any collection of machines (e.g., computers) that individually or jointly execute a set (or multiple sets) of instructions to perform any one or more of the methodologies discussed herein.

The computer system 700 includes a processing device 702, a main memory 704 (e.g., read-only memory (ROM), flash memory, dynamic random-access memory (DRAM) such as synchronous DRAM (SDRAM), etc.), a static memory 706 (e.g., flash memory, static random-access memory (SRAM), etc.), and a secondary memory 716 (e.g., a data storage device), which communicate with each other via a bus 708.

The processing device 702 represents one or more general-purpose processing devices such as a microprocessor, a microcontroller, a central processing unit, or the like. As non-limiting examples, the processing device 702 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the operations for electronically creating and trading derivative products based on one or more indices relating to volatility.

The computer system 700 may further include a network interface device 722, which is connectable to a network 150. The computer system 700 also may include a video display unit 710, i.e., a display (e.g., a liquid crystal display (LCD), a touch screen, or a cathode ray tube (CRT)), an alphanumeric input device 712 (e.g., a keyboard), a cursor control device 714 (e.g., a mouse), and a signal generation device 720 (e.g., a speaker).

The secondary memory 716 may include a non-transitory storage medium 724 on which is stored one or more sets of instructions 726 for the computer system 700 representing any one or more of the methodologies or functions described herein. For example, the instructions 726 may include instructions for implementing an asset tracking device including a power source and power management system or subsystem for a container or a trailer. The instructions 726 for the computer system 700 may also reside, completely or at least partially, within the main memory 704 and/or within the processing device 702 during execution thereof by the computer system 700, the main memory 704 and the processing device 702 also constituting computer-readable storage media.

While the storage medium 724 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description.

References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a particular implementation of determining document compatibility. This is intended solely for explanatory purposes and not limitation. In an example scenario, multiple users may anonymously provide one or more tokens related to various elements of their document (e.g., portions of a contract) and send the tokens to a central server to enable the server to determine compatibility. This enables each user to verify one or more elements of the contract without actually providing any portion of the contract to the other users.

Each user may receive a request from the server (e.g., a web server) for an indication that their contract, or their version of the contract, contains a certain element. For example, the first element may be a liquidated damages clause of a contract. The user can then open the contract locally on his/her user device via an application. The user device then identifies one or more elements within the document and determines whether the liquidated damages element exists. Next, the user device generates a token corresponding to the element. The token indicates whether the requested element exists (e.g., true value indicates the existence of the element and a false value indicates inexistence of the element). The user device then anonymously transmits the token to the server. Similarly, one or more additional users also receive the same request from the server, open a document locally on their user device, generate a token, and transmit the token to the server.

The server receives a token corresponding to the requested element from each user. The server then analyzes each token and determines whether the element is true for each user. If each user has a true value, the server determines the element to be compatible. Conversely, if at least one user has a false value, the server determines the element to be incompatible. In this example, each user has the same value. Therefore, the server determines each document is compatible based on the requested element.

The server then checks for a second element (e.g., existence of an indemnity clause). The server transmits a second request to confirm the existence of an indemnity clause in each of the user's document. As described above, each user will locally determine the existence of the element, generate a token, and anonymously transmit the token to the server. Again, the server compares the value of each received token. In this second example, all but one token indicates the documents have an indemnity clause. Because one document lacks the indemnity clause, however, the documents are determined to be incompatible. Next, the server transmits a message to each user device indicating that the documents are not compatible based on the element. By performing this method, each user learns the compatibility of his document with the group without realizing which element caused the incompatibility and without realizing which user has an incompatible document. Consequently, each user is assured that sensitive information contained in his document remains confidential.

What is claimed is:

1. A method for determining document compatibility, the method comprising:
   sending, from a server, a request to a plurality of user devices to confirm the presence of a first element in a respective document stored in each of the plurality of user devices;
   receiving, at the server, a token from each of a plurality of user devices, the token including data identifying the first element and including a value of true, indicating the respective document includes the first element, or false, indicating the respective document does not include the first element;
   comparing, with a processor of the server, the value of each of the respective tokens, and either:
      when at least one of the respective tokens has a false value:
         determining, with the processor, that the respective documents are not compatible, and
         transmitting, from the server, a first message to each of the plurality of user devices indicating that the respective documents are not compatible;
      or
      when each of the respective tokens have a true value:
         determining, with the processor, that the respective documents are compatible, and
         transmitting, from the server, a second message to each of the plurality of user devices indicating that the respective documents are compatible.

2. The method of claim 1, wherein the processor outputs at least one of the first message and the second message to each of the plurality of user devices.

3. The method of claim 1, further comprising:
requesting, by the processor and from at least two parties from the plurality of user devices, the token associated with a particular element; and
receiving, from the at least two parties, the requested token.

4. The method of claim 1, further comprising:
identifying, by the processor, the element for each token;
grouping, by the processor, each token based on the respective element; and
comparing, by the processor, the value of each of the grouped tokens.

5. The method of claim 1, wherein the respective documents comprise contracts.

6. The method of claim 1, wherein a true value of the token indicates that the respective document contains the first element, and wherein a false value of the token indicates that the respective document does not contain the first element.

7. A method for determining compatibility, the method comprising:
receiving, at a first user device, a first request from a server for a first token associated with a first element;
retrieving, with an application on the first user device, a first document from a memory of the first user device;
identifying, with a first processor, the first element in the first document;
generating, by the first processor, the first token, the first token including data identifying the first element and including a value of true indicating the first document includes the first element;
transmitting, from the first user device, the first token to the server; and
receiving, from the server, at least one of:
    a first message indicating that the first document is incompatible with a second document stored on a second user device in communication with the server;
    or
    a second message indicating that the first document is compatible with each respective document stored on a plurality of user devices in communication with the server.

8. The method of claim 7, further comprising:
receiving, by the first processor, a second request for a second token associated with a second element;
identifying, with the first processor, the second element in the first document;
generating, by the first processor, the second token, the second token including data identifying the second element and including a value of true indicating the second document includes the second element.

9. The method of claim 7, wherein the first document is received from a user.

10. The method of claim 7, wherein the first document is a contract.

11. The method of claim 7, wherein identifying the first element from the first document comprises:
identifying, by the first processor and from amongst text of the first document, a plurality of phrases;
comparing, by the first processor, each phrase from the plurality of phrases with the first element associated with the first request; and
determining, by the first processor, that at least one of the plurality of phrases matches the first element.

12. The method of claim 8, wherein the second request is received from the server.

13. The method of claim 8, wherein identifying the second element from the first document comprises:
identifying, by the first processor and from amongst text of the first document, a plurality of phrases;
comparing, by the first processor, each phrase from the plurality of phrases with the second element associated with the second request; and
determining, by the first processor, that at least one of the plurality of phrases matches the second element.

14. A method for determining document compatibility, the method comprising:
receiving, by a server, a first set of tokens from a plurality of user devices, each user device storing a respective document locally on the user device, and each respective token in the first set of tokens including data indicative of a first element and a value of true or false;
receiving, by the server, a second set of tokens from the plurality of user devices, each respective token in the second set of tokens including data indicative of a second element and a numerical value indicative of compatibility;
comparing, by a processor, the value of each of the first set of tokens;
comparing, by the processor, the value of each of the second set of tokens;
determining, with the processor, that each of the tokens in the first set has the same value;
determining, with the processor, that each of the tokens in the second set have a numerical value above a predetermined threshold; and
sending, from the server, a first message to each of the plurality of user devices indicating that the respective documents are compatible.

15. The method of claim 14, further comprising:
receiving, by the server, a third set of tokens from the plurality of user devices, each respective token in the third set of tokens including data indicative of a third element and a value of true or false;
comparing, by the processor, the value of each of the third set of tokens;
determining, with the processor, that at least one of the tokens in the third set has a false value; and
sending, from the server, a second message to each of the plurality of user devices indicating that the respective documents are incompatible.

16. The method of claim 14, further comprising:
receiving, by the server, a third set of tokens from the plurality of user devices, each respective token in the third set of tokens including data indicative of a third element and a numerical value indicative of compatibility;
comparing, by the processor, the numerical value of each of the third set of tokens;
determining, with the processor, that at least one of the numerical values is below a predetermined threshold; and
sending, from the server, a second message to each of the plurality of user devices indicating that the respective documents are incompatible.

17. The method of claim 14, wherein the respective documents comprise contracts.

18. The method of claim 14, wherein a true value of the respective token indicates that the respective document contains an element, and wherein a false value of the respective token indicates that the respective document does not contain the element.

19. The method claim 18, wherein the element comprises a clause in a contract.

20. The method claim 14, wherein the numerical value indicative of compatibility indicated whether:
- each respective document includes a particular type of clause; and
- each respective document includes a particular feature in the particular type of clause.

\* \* \* \* \*